Oct. 31, 1933.  S. M. JONSSON  1,933,176

SEPARATING MEANS FOR DISKS OF FRICTION BRAKES

Filed July 14, 1928   2 Sheets-Sheet 1

INVENTOR
Sven M. Jonsson
BY Chas. M. E. Chapman
ATTORNEY

Oct. 31, 1933.  S. M. JONSSON  1,933,176
SEPARATING MEANS FOR DISKS OF FRICTION BRAKES
Filed July 14, 1928  2 Sheets-Sheet 2
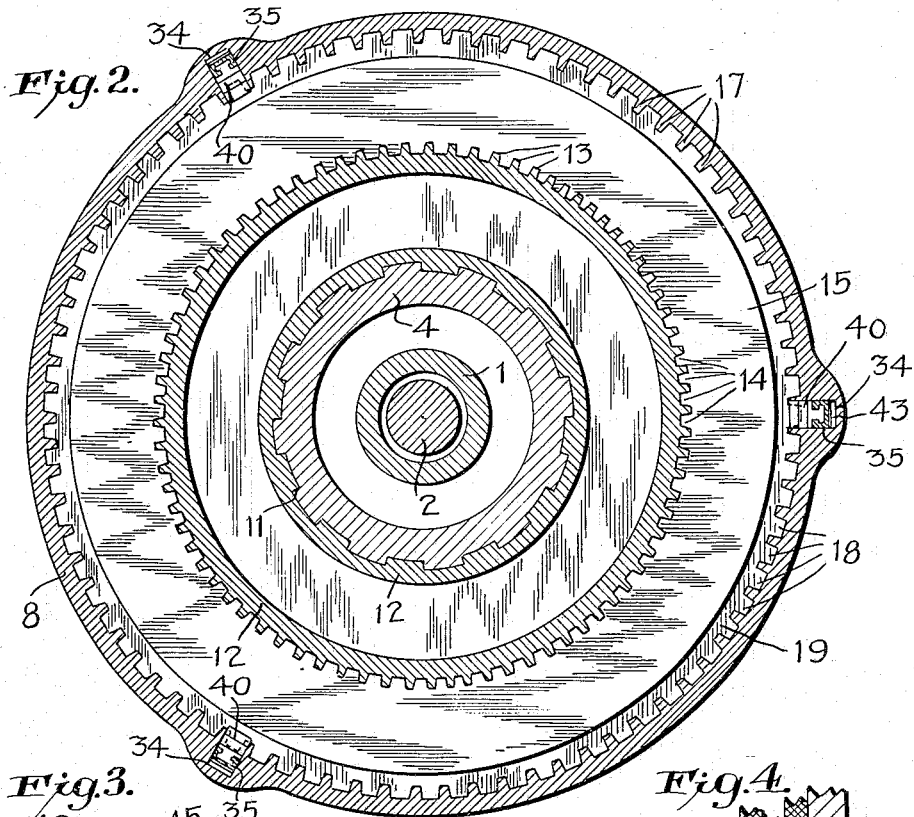
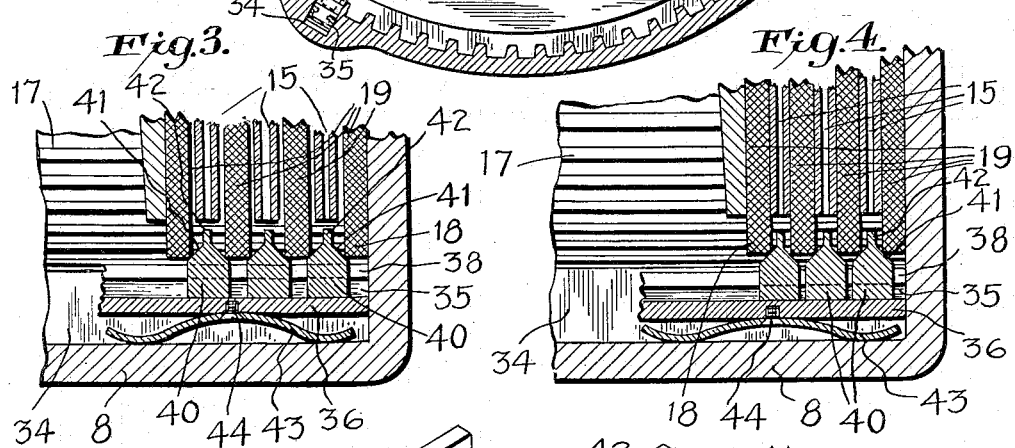
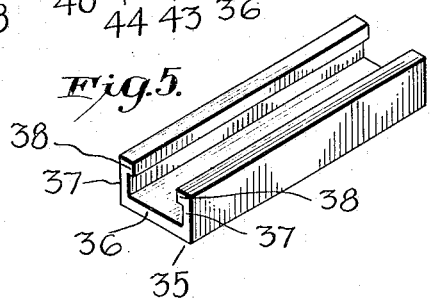
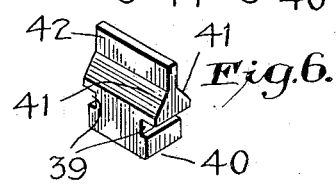
INVENTOR:
Sven M. Jonsson
BY Chas. M. E. Chapman
ATTORNEY Patented Oct. 31, 1933

1,933,176

UNITED STATES PATENT OFFICE 1,933,176

SEPARATING MEANS FOR DISKS OF FRICTION BRAKES

Sven M. Jonsson, Woodside, N. Y., assignor, by mesne assignments, to Bendix Aviation Corporation, South Bend, Ind., a corporation of Delaware Application July 14, 1928. Serial No. 292,680

9 Claims. (Cl. 188—72)

This invention has reference to brake mechanism for motor vehicles and particularly relates to a means for rendering friction brakes more efficient.

Among the objects of my invention may be noted the following: To provide means by which brake disks may be automatically separated when the braking pressure is released; to provide means by which, when the braking pressure is applied, the said separating means will be automatically thrown out of action; to provide a compact, strong, and durable device, applicable to a multi-disk brake mechanism, for engaging the disks and acting upon them to overcome any tendency to adhesion and positively separate the same; to provide a device which can be applied at a plurality of points in the circumference of the brake mechanism so as to enable its action to be imposed uniformly upon the brake disks, thus preventing the disks from dragging, overcoming any tendency to unbalanced pressures and uneven wear upon the disks; and to provide a device of the character noted which is so located as to be automatically lubricated, thus prolonging its life, avoiding undue wear upon the disks and insuring ease of operation.

With the above objects in view and others which will be detailed during the course of this description, my invention consists in the parts, features, elements and combinations thereof hereinafter described and claimed.

In order that my invention may be readily understood, I have provided drawings wherein:

Figure 2 is a cross-sectional view taken on line 2—2 of Figure 1, looking in the direction of the arrows;

Figure 3 is a fragmentary detail sectional view of my disk separating means, showing the position of the parts with the disks out of contact with each other;

Figure 4 is a similar view showing the position the parts would assume with the brake applied and the faces of the disks in contact with each other;

Figure 5 is a perspective view of the carrier for the wedge pieces; and

Figure 6 is a perspective view of one of the wedge pieces.

Figure 1:
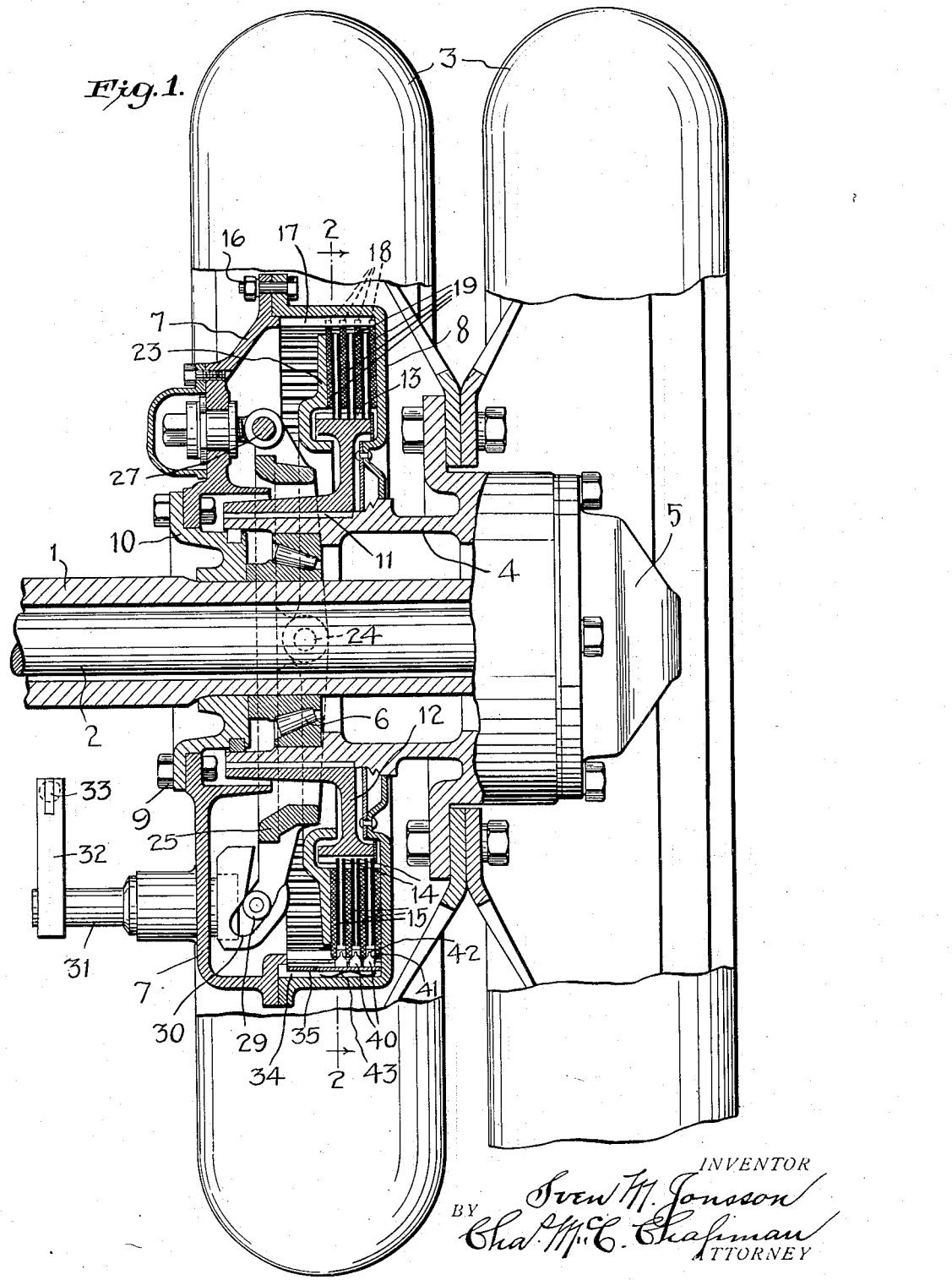
Figure 1 is a longitudinal sectional view of a double wheel with attached brake mechanism and with parts in elevation, embodying my invention.

The brakes, to which my invention is particularly applicable, comprise a set of ring-like members formed into brake-disks secured to the wheel hub and cooperating with another set of disks secured in a stationary housing. Manually operated means are provided for forcing the disks together to set the brake. My invention is particularly directed to a means for separating the disks after the brake has been released.

In order to prevent dragging or undue friction, it is essential that all the disks be separated and out of contact with each other. It is also desirable to separate them evenly so that, when the brake is applied, they will all contact at the same time to act as a positive and efficient brake.

Referring to the drawings, the numeral 1 indicates a fixed casing or housing for the driven shaft 2. Wheels 3 having suitable flanges are bolted or otherwise secured to a hub 4, the hub being splined or secured to the outer end of the driven shaft 2 through the medium of the hub cap 5. Suitable roller bearings 6 are provided between the hub 4 and the stationary casing 1. A fixed housing 7 having a cover 8 is bolted at 9 to a member 10 suitably secured to the casing 1.

Splined at 11 to the hub 4 is a flanged member 12 having teeth 13 on its circumference. These teeth 13 engage similar teeth 14 on disks 15. The disks 15 are preferably formed of two plates spaced apart so as to allow room for circulation of a lubricant and cooling medium to prevent overheating. They are preferably constructed in accordance with the pending application Ser. No. 292,726, filed July 14, 1928.

The cover 8 of the stationary housing is bolted at 16 to the body portion and is provided with internal teeth 17 which engage teeth 18 on disks 19, which are preferably formed of a friction material such as leather or some suitable composition.

A pressure member 23 is pivoted at 24 to a lever 25, the lever being annular and enclosing the hub 4, and its associated parts. The lever is fulcrumed at 27, and its opposite side carries a roller 29 which is engaged by a cam groove 30 formed in a member carried by the oscillating shaft 31. The shaft 31 has an arm 32 mounted thereon which is connected by a pull rod 33 to the brake lever. The pressure plate 23 and its operating parts, which have just been described, form the means for forcing the disks into contact with each other when the brake is to be applied.

My invention, as heretofore pointed out, resides in the means for separating the disks 15 and 19 after the pressure plate 23 has been released, and is particularly shown in Figures 3 to 6, inclusive, wherein a plurality of grooves 34 are shown as formed in the cover 8 of the stationary housing. Mounted in these grooves 34 are carriers 35, channeled to provide a web portion 36 and walls 37, terminating in tongues 38 which slidably engage grooves 39 of a series of wedge pieces 40. The wedge pieces 40 have sloping faces 41 which engage the peripheries of the friction disks 15 and 19. An extension or retaining flange 42, from the faces 41, extends between the disks and precludes any possibility of the wedge pieces 40 becoming disengaged from the disks. A spring 43 secured at 44 to the web portions 36 of the carrier 35 bears against the bottom of the grooves 34 of the cover 8, and yieldingly urges the carriers inwardly, causing the disks to separate. Figure 3 shows the disks in their separated condition, the brake being released and no pressure being applied to the pressure plate 23. The sloping faces 41 engaging the peripheries of the friction disks cause the disks to separate with an absolutely even space between them. As the brake is applied and the pressure plate is forcing the several disks together, as in Figure 4, the wedge pieces 40 will be forced outwardly from between the disks and against the pressure of spring 43, tending to flatten the latter. Immediately upon the pressure plate 23 being released, the springs 43 will force the carrier and wedge pieces inwardly and cause the disks to separate.

A suitable number of grooves 34 and carriers 35 may be arranged about the periphery of the disks 15 and 19 to secure uniform application of pressure to the circumference of the disks 19 and prevent canting of the latter, thus avoiding twisting and flexing strains. The faces 41 are so arranged that, as the disks 19 wear away, the wedges will always function to separate them. It might happen that a particular tooth 18 of the disks 19 would become worn by continued application of the wedge pieces. If this should occur, the disks 19 can be shifted circularly one tooth and thus provide a new surface for the wedge pieces to contact with. It will be understood that there is such freedom of movement between the disks 19 and wedges 40, and between the latter and the carriers 35, as to allow all the functions of the parts to be performed without impediment or undue friction.

Referring particularly to Figures 3 and 4, it will be noted that the friction disks 19 are of greater diameter than the brake disks 15, and that said disks alternate with each other. Also, that the wedges 40 may freely slide in the carrier 35 with their inclined faces between pairs of disks, thus causing the extensions or webs 42 to lie between pairs of friction disks and under individual brake disks, without contact with the latter. The web extensions 42, when the carrier is forced outwardly, prevent the wedges from shifting laterally too far to lose contact with the friction disks. Thus the webs constitute means for retaining proper cooperative relation between the wedges and the friction disks.

Having thus described my invention, what I claim and desire to secure by Letters Patent is:

1. In combination with a friction brake, means surrounding the periphery of the friction members for application of power thereto to separate the friction members when the brake is released, said means adapted to shift axially and follow said members.

2. In combination with a friction brake comprising a plurality of brake disks and a plurality of friction disks, means for yieldingly acting upon the periphery of the friction disks to separate the latter and release the brake disks when the brake is released, said means adapted to follow the axial movement of said friction disks.

3. In combination with a friction brake comprising a plurality of brake disks and a plurality of friction disks, axially floating means surrounding the several disks and causing the application of power to the friction disks to separate the several disks when the brake is released.

4. In combination with a friction brake comprising a plurality of brake disks alternating with a plurality of friction disks, and a housing for enclosing the several disks, axially floating means carried by the housing for applying pressure to the friction disks at their periphery to separate the latter when the brake is released.

5. A brake disk releasing means comprising a carrier, a plurality of axially slidable blocks mounted therein, and a spring cooperating with the carrier to force the blocks into functional operation.

6. A brake disk releasing means comprising a carrier having a dovetail groove, a plurality of blocks adapted to slide in said groove, said blocks having oppositely inclined functional faces merging into a retaining flange.

7. In combiantion with a friction brake, means for operating upon the periphery of the friction members when the brake is released for yieldingly separating said members, said means being axially shiftable with said members.

8. In a disk brake, a pair of disks rotatable together but axially movable together and relative to one another, and means for spacing said disks when released comprising an axially shiftable and resiliently radially urged wedge member engaging the peripheries of said disks.

9. A brake disk releasing means comprising a carrier, a plurality of slidable blocks therein, and a single spring cooperating with the carrier to force the blocks into functional operation.

SVEN M. JONSSON.